United States Patent
Sung

(10) Patent No.: US 9,600,942 B2
(45) Date of Patent: Mar. 21, 2017

(54) METHOD AND SYSTEM FOR NOTIFYING ALARM STATE OF VEHICLE

(71) Applicant: Hyundai Motor Company, Seoul (KR)

(72) Inventor: Yu Kyoung Sung, Incheon-si (KR)

(73) Assignee: Hyundai Motor Company, Seoul (KR)

( * ) Notice: Subject to any disclaimer, the term of this patent is extended or adjusted under 35 U.S.C. 154(b) by 396 days.

(21) Appl. No.: 14/142,695

(22) Filed: Dec. 27, 2013

(65) Prior Publication Data

US 2015/0102920 A1   Apr. 16, 2015

(30) Foreign Application Priority Data

Oct. 10, 2013   (KR) .................. 10-2013-0120744

(51) Int. Cl.
  *G07C 5/00*   (2006.01)
  *B60K 35/00*   (2006.01)
(52) U.S. Cl.
  CPC ................ *G07C 5/00* (2013.01); *B60K 35/00* (2013.01)
(58) Field of Classification Search
  CPC .................................. G07C 5/00; B60K 35/00
  USPC ......... 340/439, 901, 995.17, 995.14, 426.16, 340/438, 903, 904, 905, 573.1
  See application file for complete search history.

(56) References Cited

U.S. PATENT DOCUMENTS

| 5,801,667 A * | 9/1998 | Shimizu | H04N 7/183 340/435 |
| 6,057,781 A * | 5/2000 | Kim | H04W 84/025 340/313 |
| 2011/0128139 A1* | 6/2011 | Tauchi | B60K 35/00 340/439 |
| 2012/0212353 A1* | 8/2012 | Fung | B60K 28/06 340/905 |

FOREIGN PATENT DOCUMENTS

| JP | 07-325988 | 12/1995 |
| JP | 2008-213629 A | 9/2008 |
| KR | 10-1038630 B1 | 6/2011 |
| KR | 2012-0032596 A | 4/2012 |
| KR | 10-2012-0124256 A | 11/2012 |
| KR | 10-2013-0076218 A | 7/2013 |

* cited by examiner

*Primary Examiner* — Daryl Pope
(74) *Attorney, Agent, or Firm* — McDermott Will & Emery LLP

(57) ABSTRACT

A method and system for notifying an alarm state of a vehicle include displaying an alarm corresponding to an alarm state of an alarm state occurring in a vehicle, and determining whether a driver recognizes the displayed alarm. The alarm is displayed in a different manner based on a recognition frequency and duration of time the driver recognized the alarm when it is determined that the driver recognizes the displayed alarm. An alarm sound is output for a period of time when it is determined that the driver does not recognize the displayed alarm.

4 Claims, 5 Drawing Sheets

(a)

<Select/Notify/Guide>

(b)

< Caution: x Flickering >

(c)

<Warning: Flickering>

METHOD AND SYSTEM FOR NOTIFYING ALARM STATE OF VEHICLE

CROSS-REFERENCE TO RELATED APPLICATION

This application claims the benefit of priority to Korean Patent Application No. 10-2013-0120744 filed in the Korean Intellectual Property Office on Oct. 10, 2013, the entire contents of which are incorporated herein by reference.

TECHNICAL FIELD

The present disclosure relates to a method and system for notifying an alarm state of a vehicle. More particularly, the present disclosure relates to a method and system which differently notify an alarm state according to a degree of alarm (for example, degree of risk), a degree of alarm emergency, and/or a degree of driver's alarm recognition so that a driver may actively and rapidly handle the alarm state when the alarm state occurs in the vehicle.

BACKGROUND

Recently, as more technologies are applied to vehicles, states and/or conditions which a driver should recognize and determine are increasing. In general, a cluster, a driver state monitor (DSM), or a head-up display (HUD) is installed in a vehicle to display and notify the states and/or conditions of the vehicle for the driver. The cluster is typically installed in front of the driver's seat and provides driving information of the vehicle and operational state information of an engine, a windshield wiper, a tire, a transmission, an anti-lock braking system (ABS), a battery, etc. The cluster, for example, may include a speedometer, an odometer, a trip computer, an engine tachometer, a fuel meter, a coolant meter, a brake warning lamp, a seat-belt warning lamp, an ABS warning lamp, a traction control system (TCS) warning lamp, and a plurality of indicators for other operational and alarm states.

However, in the related art, since the cluster and devices for notifying the alarm states do not consider a degree of alarm, a degree of alarm emergency, and/or a degree of driver's alarm recognition, it is difficult for a driver to accurately recognize the alarm states.

According to Japanese Patent Laid-Open Publication No. 2008-213629 as an example of the related art to solve the problem described above, when an electronic control unit (ECU) detects an occurrence of a state to issue an alarm (warning) to a driver, an alarm content determination part of a display control system determines the content of the alarm, a risk determination part determines a degree of risk from the content of the alarm, and a display control part executes different display controls in response to the risk.

The related art example performs different display controls in response to the risk. However, it does not determine whether a driver recognizes the content of the alarm through the DSM which may detect driver's eye position and move an alarm display to the HUD according to the driver's eye position.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a method and system for notifying an alarm state of a vehicle having advantages of notifying alarm states in different ways according to a degree of alarm (e.g., degree of risk), a degree of alarm emergency, and/or a degree of driver's alarm recognition, so that a driver may actively handle the alarm state when the alarm state occurs in the vehicle.

According to an exemplary embodiment of the present disclosure, a method of notifying an alarm state of a vehicle includes displaying an alarm corresponding to the alarm state of an alarm state occurring in the vehicle, and determining whether a driver recognizes the displayed alarm. The alarm is displayed in a different manner based on a recognition frequency and duration of time the driver recognized the alarm when it is determined that the driver recognizes the displayed alarm. An alarm sound is output for a period of time when it is determined that the driver does not recognize the displayed alarm.

The step of determining whether the driver recognizes the alarm may be performed by a driver state monitor (DSM) controlled by a controller. The method may further include determining whether a driver's eye position settles on a head-up display (HUD) before the alarm sound is output when it is determined that the driver does not recognize the displayed alarm. The displayed alarm is moved to the HUD when it is determined that the driver's eye position settles on the HUD. The alarm sound is output when it is determined that the driver's eye position does not settle on the HUD.

The method may further include outputting a warning message of a front caution when the driver's eye position settles on the displayed alarm for a predetermined time or more.

The step of displaying the alarm in the different manners may include at least one of displaying a summarized alarm, a detailed alarm, and a method for taking measures against the displayed alarm.

The method may further include inquiring whether the displayed alarm is identified, and storing an alarm message corresponding to the displayed alarm when the displayed alarm is identified.

According to another embodiment of the present disclosure, a system for notifying an alarm state of a vehicle includes a cluster, a head-up display (HUD), a driver state monitor (DSM), a speaker, and a controller. The cluster is installed in a dashboard of the vehicle and provides driving information and operational state information of vehicle components. The HUD displays an object situated outside the vehicle, the driver state monitor (DSM) monitors a driver's eye movement and eye position to prevent drowsy driving, and the speaker provides an alarm sound. The controller controls the cluster, the HUD, and the speaker, and notifies the alarm state of the vehicle based on signals from the cluster, the DSM, and the HUD. The controller operates by a program, the predetermined program including a series of commands for executing the method of notifying the alarm state of the vehicle.

The operational state information of vehicle provided includes the operational state of an engine, a windshield wiper, a tube, etc.

According to an embodiment of the present disclosure, it is possible to notify an alarm state according to a degree of alarm (for example, degree of risk), a degree of alarm emergency, and/or a degree of driver's alarm recognition in different ways so that a driver may actively manage each alarm state when the alarm state occurs in the vehicle.

According to an embodiment of the present disclosure, it is also possible to display borders of a display device (for example, the HUD) with different colors based on the importance of an alarm state upon notifying of the alarm state occurring in a vehicle so that a driver rapidly recognizes a degree of risk. Furthermore, it is possible to store the alarm state in a storage medium when the driver recognizes the alarm state through the DSM, and to notify the alarm state on the HUD based on a driver's eye position when the driver does not recognize the alarm state.

DETAILED DESCRIPTION

Figure 1:
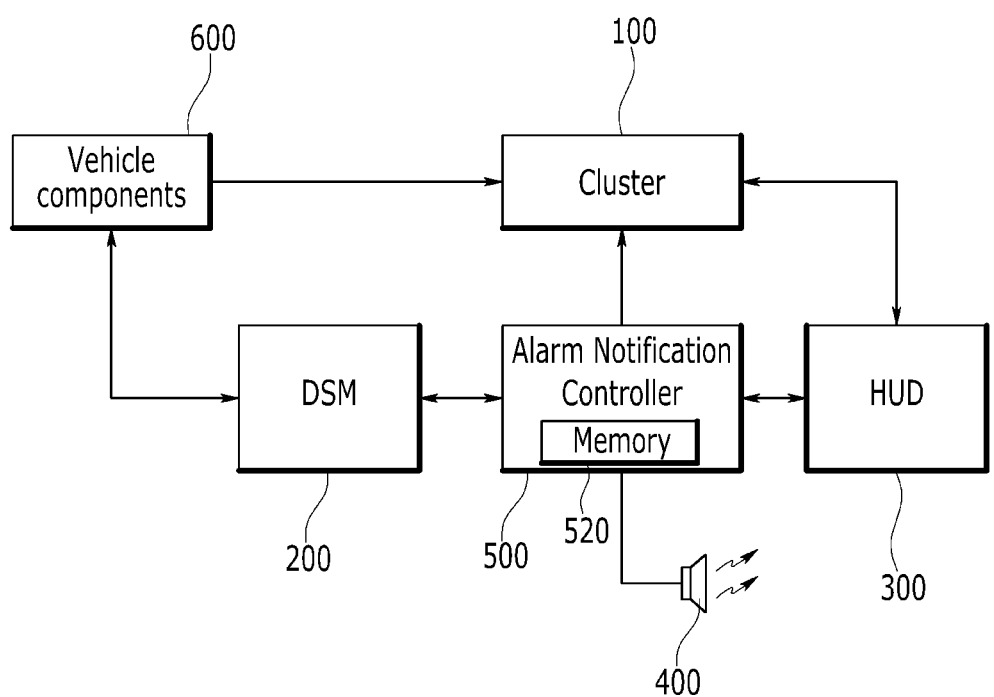
FIG. 1 is a block diagram for showing a system for notifying an alarm state of a vehicle according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Unless explicitly described to the contrary, the word "comprise" and variations such as "comprises" or "comprising" will be understood to imply the inclusion of stated elements but not the exclusion of any other elements. Like reference numerals designate like elements throughout the specification.

FIG. 1 is a block diagram for showing a system for notifying an alarm state of a vehicle according to an exemplary embodiment of the present disclosure.

The system for notifying an alarm state of a vehicle according to an exemplary embodiment of the present disclosure is a system that may differently notify an alarm state according to a degree of alarm (for example, degree of risk), a degree of alarm emergency, and/or a degree of a driver's alarm recognition.

The system according to an exemplary embodiment of the present disclosure may include a cluster 100, a head-up display (HUD) 300, a driven state monitor (DSM) 200, a speaker 400, and a controller 500. The cluster 100 may be installed in a dashboard (not shown) of the vehicle or in front of a driver's seat (not shown) and may provide driving information and operational state information of vehicle components 600, such as an engine, a windshield wiper, a tire, and so on. The HUD 300 may display an object situated outside the vehicle, the DSM 200 may monitor a driver's eye movement and eye position to prevent drowsy driving, and the speaker 400 may output an alarm sound. The controller 500 may control the cluster 100, the HUD 300, and the speaker 400 and notify the alarm state of the vehicle based on signals from the cluster 100, the DSM 200, and the HUD 300.

In an exemplary embodiment of the present disclosure, the cluster 100, the DSM 200, the HUD 300, and the speaker 400 may be those typically applied in the related art, so a detailed description thereof will be omitted.

The controller 500 may include one or more processors or microprocessors and/or hardware operated by a program including a series of commands for executing a method of notifying an alarm state of a vehicle according to an exemplary embodiment of the present disclosure, which will be described below. The controller 500 may include a memory 520 which stores information and/or data.

Figure 3:
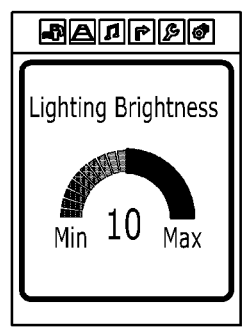
FIGS. 3 to 5 are drawings for explaining operation of a method and system according to an exemplary embodiment of the present disclosure.
Figure 3:
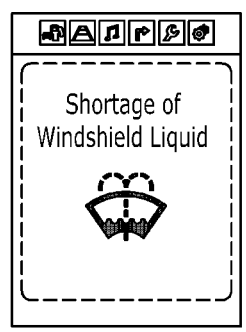
Figure 3:
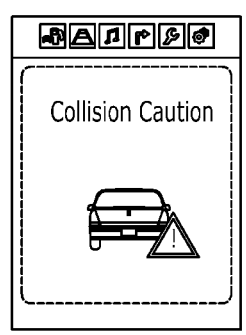

In an exemplary embodiment of the present disclosure, the controller 500 may control the cluster 100 or the HUD 300, and may perform various kinds of alarm notifications as shown in FIG. 3.

FIG. 3(a) shows an example of typical alarm notifications with "Select", "Notify," and "Guide." FIG. 3(b) shows an example of notifying the alarm state that requires caution by flickering a display state for a predetermined number of times. FIG. 3(c) shows an example of notifying an urgent alarm state by flickering pop-up border on an alarm state display with a predetermined color (for example, red).

In other words, the controller 500 may control the cluster 100 and/or the HUD 300, and display the border of a display portion of the cluster 100 and/or the HUD 300 with different colors based on an importance of the alarm state (for example, failure content) upon notifying the alarm state so that a driver rapidly recognizes a degree of risk. The controller 500 may also store the alarm state in the memory 520 when the driver recognizes the alarm state through the DSM 200, and notify the alarm state through the HUD 300 based on the driver's eye position when the driver does not recognize the alarm state.

The controller 500 may output the pop-up border of the display portion with the predetermined color based on alarm characteristics (degree of risk) when the alarm state occurs. The controller 500 may also display the pop-up border continuously flickering according to a degree of alarm emergency.

Hereinafter, a method of notifying an alarm state of a vehicle according to an exemplary embodiment of the present disclosure will be described in detail with reference to the accompanying drawings.

Figure 2:
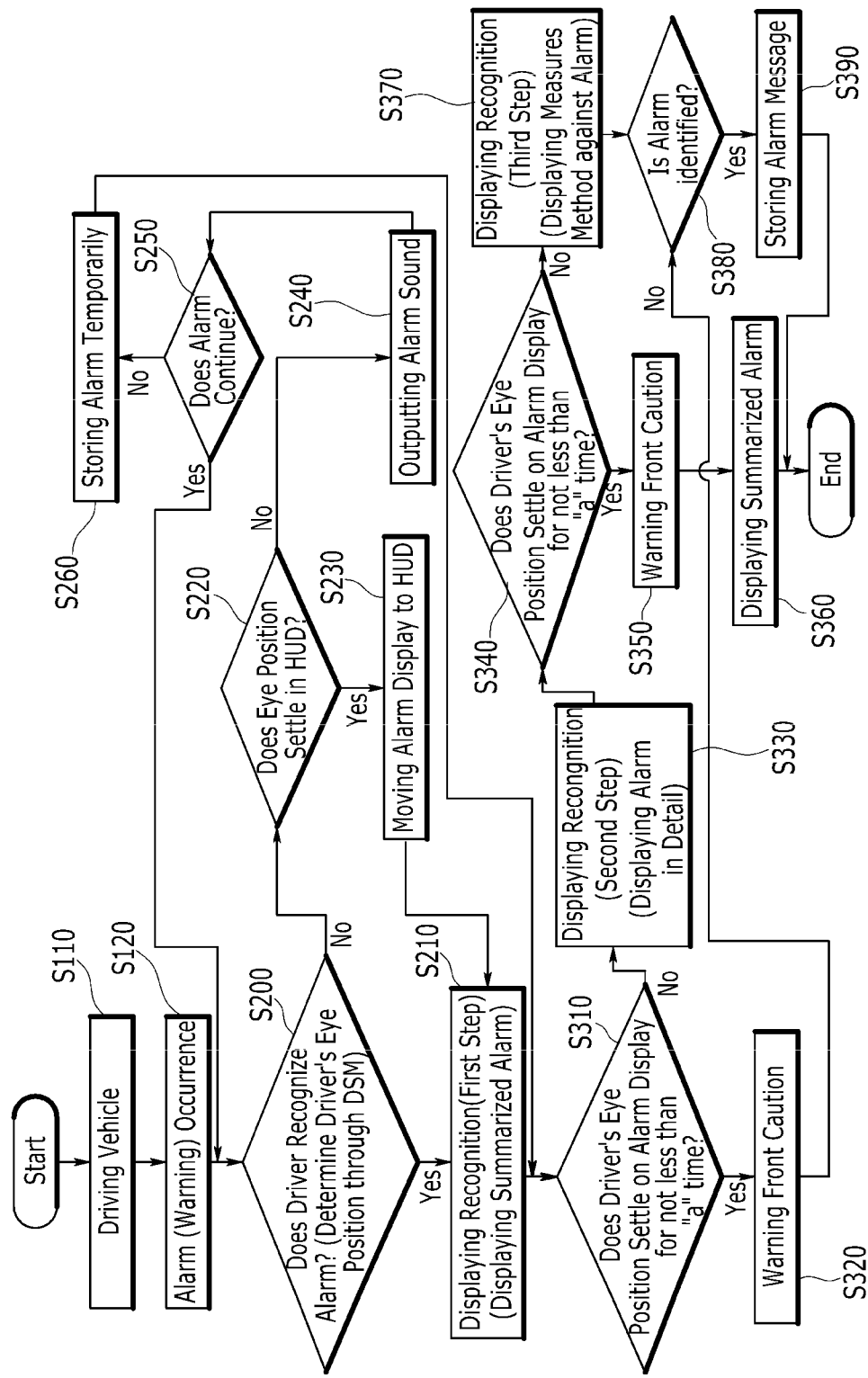
FIG. 2 is a flowchart for showing a method of notifying an alarm state of a vehicle according to an exemplary embodiment of the present disclosure.

FIG. 2 is a flowchart for showing a method of notifying an alarm state of a vehicle according to an exemplary embodiment of the present disclosure.

As shown in FIG. 2, the controller 500 determines whether a driver recognizes an alarm state when the alarm state occurs while a vehicle is driving at steps S110, S120, and S200.

The occurrence of the alarm state may be displayed in the cluster 100 and/or the HUD 300 as in the related art. For example, when the amount of windshield liquid is low, a warning sign is displayed on the cluster 100 and/or the HUD 300 as shown in the first drawing of FIG. 4.

The controller 500 determines whether the driver's eye position settles on the warning sign for a predetermined time (a) through the DSM 200. When the driver's eye position settles on the warning sign for the predetermined time (a), the controller 500 determines that the driver has recognized the warning sign.

Figure 4:
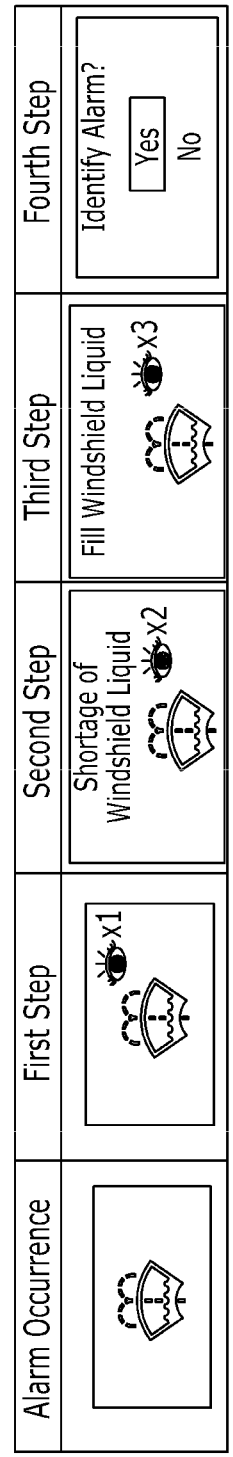

When it is determined that the driver has recognized the warning sign, as shown in the second drawing of FIG. 4, the controller 500 displays that the driver has recognized the warning sign by displaying an eye image to inform that the driver has recognized the warning sign once as a first stage of recognition. Then, the controller 500 displays the warning sign in a summarized manner in the first stage of recognition at step S210.

After the first stage of recognition, the driver's eye position may settle on a position other than the warning sign. Referring to steps S310 and S330 of FIG. 2 and the third drawing of FIG. 4, when the driver's eye position settles on the warning sign for a predetermined time after the first stage of recognition, the controller 500 displays that the driver recognizes the warning sign twice as a second stage of recognition by additionally displaying a predetermined warning message (e.g., "Shortage of Windshield Liquid") to inform a detailed content of the warning sign.

In addition, as a third stage of recognition, the controller 500 may display a method for measures (e.g., "Fill Windshield Liquid) against the warning sign as shown in the fourth drawing of FIG. 4 and steps S340 and S370 of FIG. 2. The third stage of recognition may be performed when the driver's eye position settles on the warning sign for a predetermined time again after the second stage of recognition.

As a fourth stage of recognition, the controller 500 may display a message and/or an image to identify whether the driver has recognized the warning sign as shown in the fifth drawing of FIG. 4 and steps S380 and S390 of FIG. 2. The fourth stage of recognition may be performed when the driver's eye position settles back to the warning sign from for a predetermined time after the third stage of recognition. In the fourth stage of recognition, if the driver has recognized the warning sign, the controller 500 may store data, the message, and/or information related to the warning sign in the memory 520.

When the driver does not recognize the warning sign at step S200, the controller 500 may move the warning sign to the HUD 300 and output an alarm sound through the speaker 400 so that the driver can recognize the warning sign at steps S220, S230, and S240. The controller 500 may maintain the alarm sound for a predetermined time, and store the warning alarm temporarily after passage of the predetermined time at steps S250 and S260.

In the fourth stage of recognition, if the driver's eye position is not on the warning sign when the driver presses a button of storing (or "Yes" button), the controller 500 maintains the alarm display based on the first stage of recognition to prevent a false operation of the button.

When the driver's eye position is on the warning sign for the predetermined time at steps S310 and S340, the controller 500 may output an alarm for warning front caution at steps S320 and S350.

After performing step S350, the controller 500 may output the summarized alarm display as shown in the first drawing of FIG. 4 and step S360 of FIG. 2.

Although an on/off alarm such as, shortage warning of a smart-key battery as a button starting message occurs when the driver recognizes the on/off alarm, the controller 500 may store the on/off alarm and display the on/off alarm in the case in which the driver's eye position is on the cluster 100 or the HUD 300 for a predetermined time. The on/off alarm is an alarm that is turned off after being turned on for a predetermined time. The above described exemplary embodiment, for example, may be useful in case the driver does not recognize an alarm such as the on/off alarm due to a surrounding environment, such as while driving in bad weather.

Figure 5:
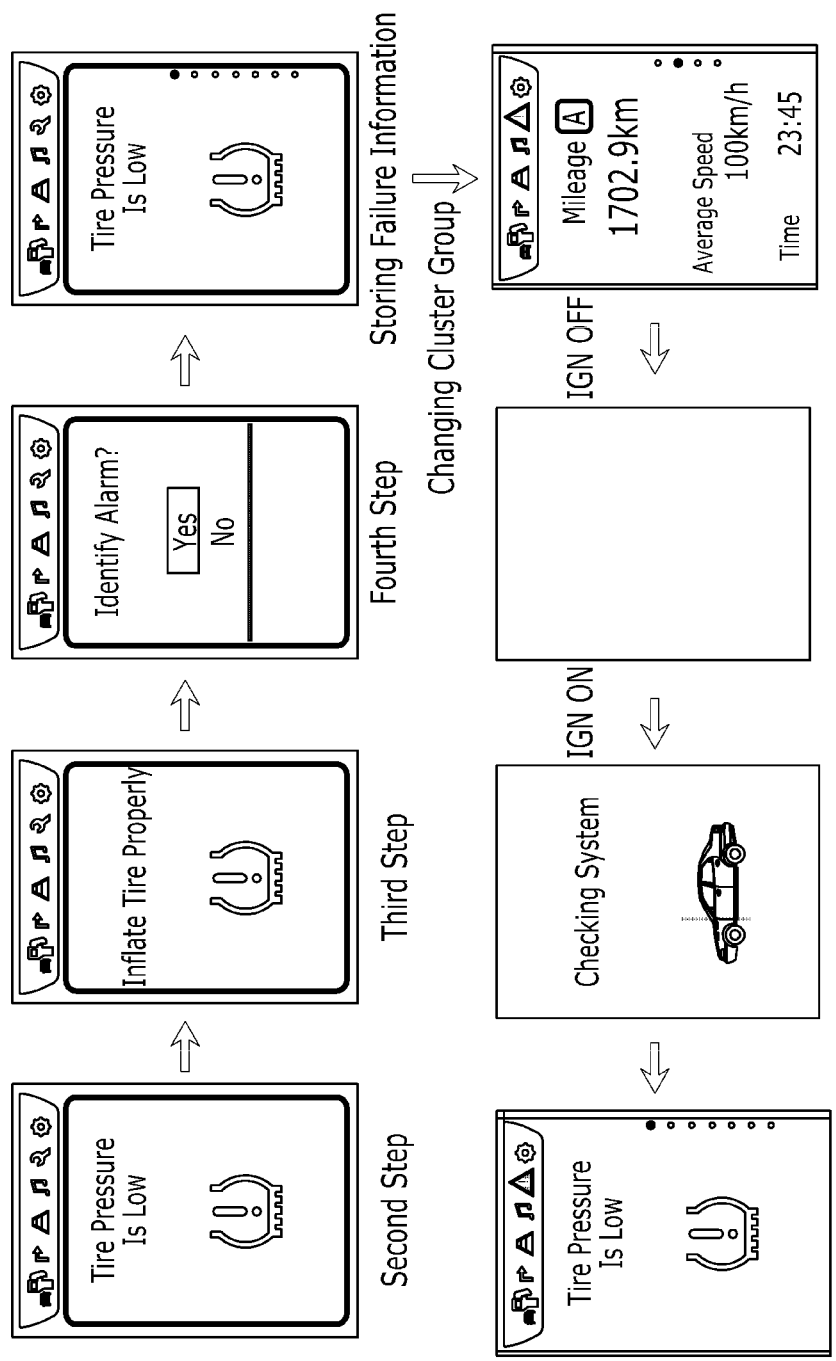

In addition, the controller 500 may take out failure information stored in the memory in an ignition (IG) ON state to notify the failure information as shown in FIG. 5.

According to an exemplary embodiment of the present disclosure, it is possible to improve recognition ability for an alarm occurring in a vehicle, convenience of driving and product quality by removing a situation in which a recognized alarm disturbs information display of a vehicle.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of notifying an alarm state of a vehicle, the method comprising:
    displaying, by a controller, an alarm corresponding to the alarm state of the vehicle;
    determining, by the controller, whether a driver recognizes the displayed alarm;
    displaying, by the controller, the displayed alarm in a different manner based on a recognition frequency and duration of time the driver recognized the alarm when it is determined that the driver recognizes the displayed alarm;
    outputting, by the controller, an alarm sound for a period of time when it is determined that the driver does not recognize the displayed alarm;
    inquiring whether the displayed alarm is identified; and
    storing an alarm message corresponding to the displayed alarm when the displayed alarm is identified,
    wherein the step of displaying the displayed alarm in the different manner comprises at least one of displaying a summarized alarm, a detailed alarm, and a method for taking measure against the displayed alarm.

2. The method of claim 1, wherein the step of determining whether the driver recognizes the alarm is performed by a driver state monitor (DSM) controlled by the controller, wherein the method further comprises:
    determining whether the driver's eye position settles on a head-up display (HUD) before outputting the alarm sound when it is determined that the driver does not recognize the displayed alarm;
    moving the displayed alarm to the HUD when it is determined that the driver's eye position settles on the HUD; and
    outputting the alarm sound when it is determined that the driver's eye position does not settle on the HUD.

3. The method of claim 1, further comprising outputting a warning message of a front caution when the driver's eye position settles on the displayed alarm for a predetermined time or more.

4. A system for notifying an alarm state of a vehicle, the system comprising:
    a cluster configured to be installed in a dashboard of the vehicle and provide driving information and operational state information of vehicle components;
    a head-up display (HUD) configured to display an object situated outside the vehicle;
    a driver state monitor (DSM) configured to monitor a driver's eye movement and eye position to prevent drowsy driving;
    a speaker configured to give an alarm sound; and
    a controller configured to control the cluster, the HUD, and the speaker and notify the alarm state of the vehicle based on signals from the cluster, the DSM, and the HUD,
    wherein the controller displays at least one of a summarized alarm, a detailed alarm, and a method for taking measure against the displayed alarm and stores an alarm message corresponding to the displayed alarm when the displayed alarm is identified, and
    wherein the controller operates by a program, the program including a series of commands for executing a method of notifying the alarm state of the vehicle.

\* \* \* \* \*